United States Patent
Lee et al.

(10) Patent No.: US 6,813,435 B1
(45) Date of Patent: Nov. 2, 2004

(54) METHOD FOR RECORDING INFORMATION FOR FAST ACCESSING AN AREA ON AN OPTICAL RECORDING MEDIUM

(75) Inventors: Seong-Ju Lee, Kyunggi-do (KR); Han-Seop Ryu, Inchun (KR); Jae-Ryong Cho, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/352,680

(22) Filed: Jul. 14, 1999

(30) Foreign Application Priority Data

Jul. 14, 1998 (KR) .......................................... 98-28285

(51) Int. Cl.[7] .................................................. H04N 5/91
(52) U.S. Cl. ........................ 386/68; 386/111; 386/112
(58) Field of Search .............................. 386/46, 67–69, 386/78–81, 95, 111–112, 124, 31, 35; 725/59; 360/71, 72.1, 72.2, 72.3; 348/699, 700; 375/240

(56) References Cited

U.S. PATENT DOCUMENTS

| | | | | |
|---|---|---|---|---|
| 5,613,032 A | * | 3/1997 | Cruz et al. ..................... 386/69 |
| 5,819,003 A | * | 10/1998 | Hirayama et al. ............ 386/95 |
| 5,894,320 A | * | 4/1999 | Vancelette .................... 725/59 |
| 5,933,567 A | * | 8/1999 | Lane et al. .................... 386/68 |
| 6,101,222 A | * | 8/2000 | Dorricott ..................... 348/700 |
| 6,269,215 B1 | * | 7/2001 | Okayama et al. ............. 386/31 |
| 6,314,137 B1 | * | 11/2001 | Ono et al. ................... 375/240 |
| 6,363,212 B1 | * | 3/2002 | Fujinami et al. ............ 386/112 |

* cited by examiner

Primary Examiner—Thai Tran
Assistant Examiner—Christopher Onuaku
(74) Attorney, Agent, or Firm—Birch, Stewart, Kolasch & Birch, LLP

(57) ABSTRACT

An apparatus for recording/reproducing real-time data and a control method therefore including a recorder for sequentially recording incoming real-time video data on a recording medium, a memory for storing information on the recording position of the sequentially recorded video data by organizing the information in accordance with signal sources, and control means for controlling the recorder so that the information on the recording position is recorded in a specific area of the recording medium. The apparatus enables trick-play of real-time data playback of the video data obtained by a particular camera or high-speed playback of video data.

6 Claims, 2 Drawing Sheets

METHOD FOR RECORDING INFORMATION FOR FAST ACCESSING AN AREA ON AN OPTICAL RECORDING MEDIUM

BACKGROUND OF THE INVENTION

1. Field of the Invention

The present invention relate to an apparatus for recording/reproducing real-time data and a control method therefor, and more particularly, but not by way of limitation, to an apparatus which records real-time data so that trick-play is available and a method for controlling the apparatus.

2. Description of the Related Art

Real-time data are the data that we usually deal with in our daily lives. Take a video camera for example. When we capture images of objects using a video camera, the video camera simply records video signals corresponding to motion of the objects seen by the video camera on a recording medium. In this case, the video signals are recorded on the recording medium as they are obtained, that is, no control information is added or no data processing is conducted before they are recorded. Such video signal is an example of real-time data.

Another example of real-time data is the data captured by CCTV's commonly used in banks, companies, or museums. The data captured by CCTV's are continuously recorded on a recording medium as long as the recording medium has free space to store the data, wherein the data obtained from a plurality of cameras are sequentially recorded on a single recording medium.

In other words, real-time data means raw data which have not been modified or processed before being recorded on a recording medium and therefore contain no additional control information for playback of the data. As a result, users do not know which data are recorded in which part of the recording medium.

As opposed to real-time data, we also deal with processed data. In the case of a video data, video data captured by a video camera can be recorded on a recording medium after being modified. Control information can be added to the video data for later access to the data. Such data are called processed data.

Music data or movie data recorded on a CD or DVD are a popular example of processed data which we commonly deal with. Since such music or movie data contain control information indicative of which data are recorded on which part of the disk, users can selectively play back specific data of interest by referring to the control data.

To sum up, real-time data are defined as data recorded on a recording medium in such a way that users do not know which data are recorded on which part of the recording medium, whereas process data are defined as data recorded on a recording medium together with control data pertaining to the location of the data on the recording medium so that users can selectively access specific data.

Therefore, processed data may be played back in various ways as long as the reproducing apparatus supports. For example, a music CD can be played back in higher speeds as well as normal speed. This is because a specific part of the recorded data can be selectively played once the CD player recognizes and interprets the control data contained in the music data recorded on the CD.

A general DVD can contain video images corresponding to a scene captured from up to 9 different angles and control data pertaining to each angle data are recorded together with the video data on the DVD. Thus, if a DVD player recognizes the control data, it can locate the video data related to a specific view angle chosen by a user and play back only the angle data.

As mentioned above, a recording medium containing processed data can be played back in several different ways such as high-speed playback and playback of a specific angle data. In contrast to normal playback of data, such a playback scheme is called trick-play.

Control data are inevitable for trick-play and so such trick-play is not available with real-time data, which are simply recorded on a recording medium with no additional control data. In a CCTV system, video data obtained by a plurality of cameras are sequentially recorded on a recording medium, with no additional information on which data are captured by which camera. Hence, it is impossible to selectively play back the video data captured by a specific camera.

Likewise, it is also impossible to play back recorded data in a high speed until the video data captured by a specific camera appear, because control data related to each camera are needed for locating the video data captured by the chosen camera and the reproducing apparatus should recognize the control data for locating the video data captured by the specific camera. Conventional apparatuses simply record incoming real-time data and thus are not capable of trick-play due to lack of control data.

SUMMARY OF THE INVENTION

It is an object of the present invention to provide an apparatus for recording real-time data which enables trick-play of the recorded real-time data and a control method for the apparatus.

The apparatus for recording/reproducing real-time data according to the present invention comprises recording means for sequentially recording incoming real-time video data on a recording medium, storing means for storing information on the recording position of the sequentially recorded video data by classifying the information in accordance with signal sources, and control means for controlling the recording means in order to record the stored information on the recording position in a particular part of the recording medium.

The apparatus for recording/reproducing real-time data according to the present invention further comprises change detection means for detecting a change in video data by comparing incoming video data with the video data received right before the incoming video data, wherein the recording means only records incoming video data which differs from the compared video data obtained previously.

The method for recording/reproducing real-time data according to the present invention comprises the steps of sequentially recording incoming real-time video data on a recording medium, storing information on the recording position of the sequentially recorded video data in a storing means after dividing the information according to signal sources, and recording the information on recording position in a particular part of the recording medium.

BRIEF DESCRIPTION OF THE DRAWINGS

The accompanying drawings, which are included to provide a further understanding of the invention, illustrate the preferred embodiments of this invention, and together with the description, serve to explain the principles of the present invention.

In the drawings.

DETAILED DESCRIPTION OF THE PREFERRED EMBODIMENT

In order that the invention may be fully understood, preferred embodiments thereof will now be described with reference to the accompanying drawings.

Figure 1:
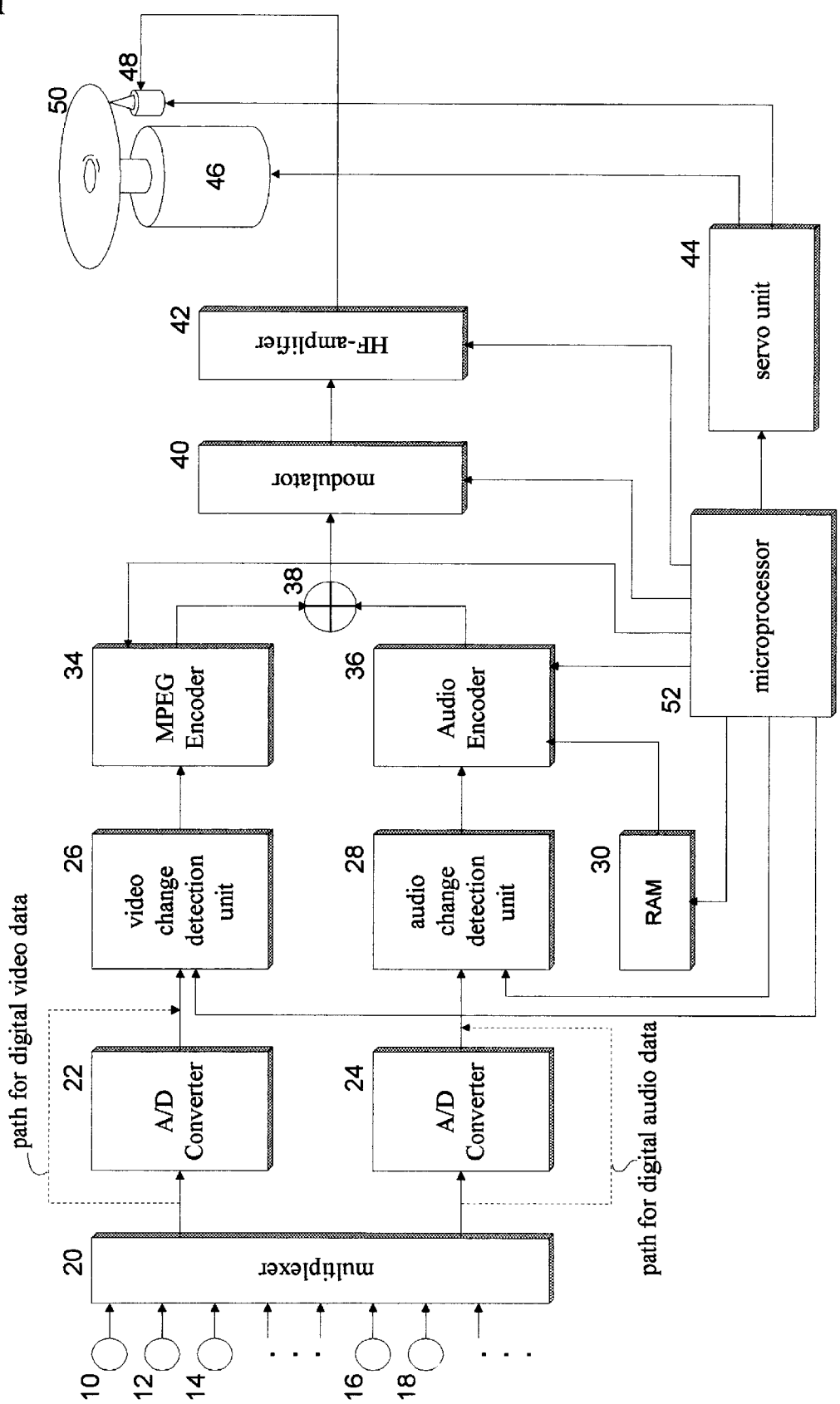
FIG. 1 is a block diagram of a real-time data recording/reproducing apparatus embodying the present invention.

FIG. 1 illustrates a real-time data recording/reproducing apparatus in which the present invention may be practiced. The apparatus comprises a plurality of cameras 10, 12, 14, . . . for obtaining video data corresponding objects from different view angles, a plurality of microphones 16, 18, . . . for obtaining audio signals, a multiplexer 20 for choosing a video and audio signal from among video and audio signals obtained by the multiple cameras and microphones, a first A/D converter 22 for digitizing the analog video signal outputted from multiplexer 20, a second A/D converter 24 for digitizing the analog audio signal outputted from multiplexer 20, a video signal change detection unit 26 for detecting a change in video data by comparing the video data from first A/D converter 22 with previously obtained video data, an audio signal change detection unit 28 for detecting a change in audio data by comparing the audio data from second A/D converter 24 with previously obtained audio data, an MPEG encoder 34 for encoding video data with a view to recording the video data on a recording medium 50 when a change in the video data is detected by video signal change detection unit 26, an audio encoder 36 for encoding audio data with a view to recording the audio data on recording medium 50 when a change in the audio data is detected by audio signal change detection unit 28, a mixer 38 for mixing the video data from MPEG encoder 34 and audio data from audio encoder 36 to generate composite signals, a modulation unit 40 for modulating the composite signals from mixer 38 to convert the composite signals into recording signals, a high-frequency amplification unit 42 for amplifying the modulated composite signals, a pickup 48 for recording the modulated composite signals on recording medium 50 rotated by motor 46, a servo unit 44 for controlling pickup 48, a RAM 30 for temporarily storing the start location of data recording when recording the modulated composite signals on recording medium 50, and a microprocessor 52 for supervising the operation of each component.

If the signals from the cameras and microphones are digital data, first A/D converter 22 and second A/D converter 24 for digitizing the signals are not needed. Also, if recording of input data on recording medium 50 is performed continuously without regard to a change in the data, video signal change detection unit 26 and audio signal change detection unit 28 can be left out because they are intended for recording of data only when a change in the data is detected.

Figure 2:
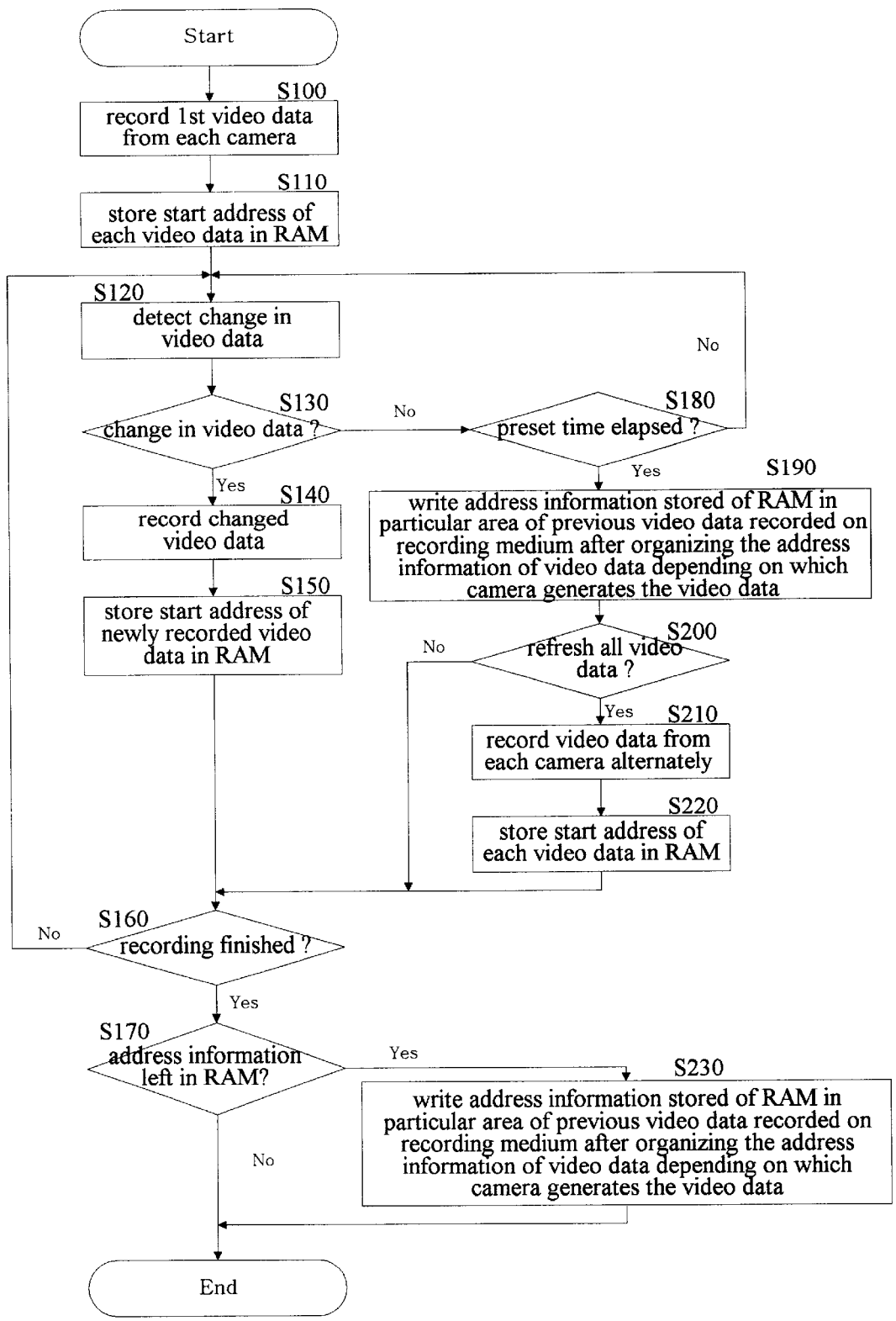
FIG. 2 is a flow diagram of the method for trick-play of real-time data according to the present invention.

Referring to a flow chart shown in FIG. 2, the procedure for trick-play of real-time data in the recording/reproducing apparatus is explained in detail.

Once recording medium 50 with no data recorded on it is inserted in the apparatus, the real-time data recording/reproducing apparatus remains on stand-by under the control of microprocessor 52.

If video data and audio data are received from the plurality of cameras and microphones in the stand-by mode, multiplexer 20 alternately outputs video and audio data received from each camera and microphone. The video and audio data outputted by multiplexer 20 are digitized by first and second A/D converters 22 and 24 and encoded by MPEG encoder 34 and audio encoder 36 for data recording, respectively. Neither of video signal change detection unit 26 and audio signal change detection unit 28 works in this phase, since the video and audio data are the first data obtained in the stand-by mode.

Mixer 38 mixes the digital video and audio data for generating composite signals. The composite signals are amplified by high-frequency amplification unit 42 after being modulated by modulation unit 40 and finally recorded on recording medium 50 by pickup 48.

The video and audio data from each camera and microphone are recorded on recording medium 50 as they are outputted from multiplexer 20. Hence, the recorded data are organized on recording medium 50 in such a way the first video/audio data captured by a camera/microphone are followed by the first video/audio data captured by the next camera/microphone (S100).

When recording the video/audio data in step S100, microprocessor 52 keeps investigating which camera/microphone yields the video/audio data currently being recorded and stores the start address of the recorded data received from each camera/microphone in RAM 30 (S110).

For example, suppose that the first video data obtained from first camera 10 are recorded from address A1, and the first video data obtained from second camera 12 are recorded from address A2. Then microprocessor 52 simultaneously stores in RAM 30 the start address of data captured by the first camera and the start address of data captured by the second camera separately.

Also, the start addresses of recorded data are divided based on playback speeds and stored. In other words, the start addresses of video data according to the playback order in various playback speeds are stored as well as those in normal playback. In this case, the number of recorded start addresses decreases in proportion to the playback speed since some recorded data are skipped in high speed playback and the number of skipped data increases with the playback speed.

Throughout the recording phase, multiplexer 20 alternately outputs video/audio data from each camera/microphone one at a time. All video and audio data except the data received first in the stand-by mode are applied to video signal change detection unit 26 and audio signal change detection unit 28 wherein it is tested if the incoming data differ from the previously obtained data (S120). The video signal can be compared by the unit of video frame or other basic data units obtained from the cameras or microphones.

Note that video signal change detection unit 26 only compares the video data obtained from the same camera and audio signal change detection unit 28 only compares the audio data obtained from the same microphone. Each camera captures images from its own view angle and so the comparison of data captured by different cameras is meaningless. This also applies to audio data obtained from multiple microphones.

If it is confirmed that the Nth and (N−1)-th video data captured by the same camera are identical (S130), it is tested that a prescribed time period has elapsed since the Nth video data were obtained (S180).

If the prescribed time duration has not elapsed yet in S180, steps S120 and S130 are repeated to detect a change in video data.

If it is confirmed that the two video data compared in S180 are different, video signal change detection unit 26 outputs the detected video data, which are recorded on recording medium 50 by pickup 48 after being encoded by MPEG encoder 34, modulated by modulation unit 40, and amplified by high-frequency amplification unit 42 in turn (S140)

In consequence, only the video data which differ from the previous video data obtained right before the current video data are recorded on recording medium 50. The data recording is conducted continuously from the location where the previous data recording finishes in S100.

When recording the video data, microprocessor 52 checks which camera yields the video data being recorded and stores in RAM 30 the start address A3 where the video data is recorded (S150)

Repeating the above procedure to record video data on recording medium 50, microprocessor 52 keeps recording the start addresses of recorded data in RAM 30 until data recording process finishes (S160)

In the meantime, if it is confirmed in S180 that a change in video data is not detected for a prescribed time duration, microprocessor 52 records the address data stored in RAM 30 in a specific area of recording medium 50 (S190).

To put it differently, taking advantage of the time duration during which incoming video data remain unchanged, microprocessor 52 records the start addresses of video data from each video camera stored in RAM 30 in a particular area of recording medium 50. Since address data A1 and A2 obtained in S110 is the start addresses of the video data obtained first in the stand-by mode, it is desirable that the address data should be recorded around the first part of the recording medium. Likewise, position data A3, the start address of the Nth video data, should be recorded in the area near the (N−1)-th video data obtained by the same camera.

To be more specific, the particular area can be the last part of the recording area where the video data obtained by the same camera right before the current data are recorded. Suppose that the (N−1)-th data from camera 10 are recorded in area A1 of the recording medium and the Nth data from the same camera are recorded in area A2. Then the start address of area A2 is recorded in the last part of area A1.

As another embodiment of the present invention, the address information can be recorded in the header area of the video data obtained right before the current data by the same camera. Also, the address information can be recorded in a control area, if a special control area is reserved on the recording medium.

Apart from recording the information on the start address of each video data in a particular area, start addresses stored in RAM 30 being divided in accordance with the playback speeds are recorded in the header area of data recorded on recording medium 50.

Unless additional information for high speed playback exists on the recording medium, the header area of every video data should be accessed to find the position of the video data to be played back in the high-speed playback mode, though some video data are actually skipped in the high-speed playback mode. Position information recorded being classified by the playback speeds makes it possible to access only the video data which should be actually played back without accessing unnecessary video data.

In S190 for recording the data stored in RAM 30 in a particular area of recording medium 50, microprocessor 52 commands servo unit 44 to move pickup 48 to the particular area and record the data there.

If the video data obtained from each camera still remain unchanged until the recording process in S190 finishes (S200), microprocessor 52 performs refreshment of the video data obtained from all cameras.

The refreshment process is similar to the process of sequentially recording video data from multiple cameras on the recording medium performed during system initialization (S210).

While the video data from each camera are sequentially recorded in S210, the start address of each video data also is stored in RAM 30 (S220).

In S160, microprocessor 52, checks whether data recording should terminate, for example, due to the recording medium being full. If so, microprocessor 52 checks whether some address information which has not been recorded on the recording medium yet is left in RAM (S170). If so, microprocessor 52 executes another step to record the address information stored in RAM 30 in the particular part of the video data previously recorded on recording medium 50 (S230).

In summary, microprocessor 52 stores the address information in RAM 30 while the video data are recorded on recording medium 50 and records the address information in a particular area of recording medium 50 after data recording completely finishes or between recording of video data.

According to the above recording method, the video data being currently played back contain the start address of the next video data captured by the same camera. It is therefore possible to play back only the video data obtained by the same camera since the location of the next video data to be played back can be found in the control information of the video data being currently played.

In addition, high speed playback of real-time data recorded on the recording medium is also possible. In the case where video data recorded on a digital video disk are played back in a high speed, only the I-pictures, which is the basic unit of video data, are reproduced. Hence, microprocessors 52 temporarily stores the start addresses of I-pictures in RAM 30 when recording video data on the recording medium, and records the address data in the control area of the recording medium, which is reserved during the data recording process, thereby enabling the playback of I-pictures.

As explained so for, the present invention makes it possible to play back only the real-time video data captured by a particular camera or to play back real-time data in various playback speeds by storing start address of each real-time video data while recording the real-time data on a recording medium and recording the stored address information on the recording medium, which maximizes system usability and provides users with versatile functions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording information for fast accessing an area on a storage medium, comprising:
   (a) receiving input data from at least one of a plurality of different sources;
   (b) generating a source identification (ID) information corresponding to a selected source;

(c) determining access information for fast accessing of at least one of I-picture data input from the selected source, wherein the access information is used for performing special plays using various play back speeds;

(d) temporarily storing the determined access information of I-picture data associated with the source ID information of the selected source; and (e) recording the temporarily-stored access information and the source ID information on a predetermined area of the storage medium, wherein the predetermined area is located within a management area separate from a data area of the storage medium.

2. The method of claim 1, further comprising the step of MPEG encoding of real time input data.

3. The method of claim 1, wherein the plurality of different sources are a plurality of different cameras.

4. The method of claim 1, wherein the management area of the storage medium is a special control area reserved on the storage medium for recording the temporarily stored access information.

5. The method of claim 1, wherein the step (e) of recording the temporarily stored access information is performed separate from recording of data into the data area of the storage medium.

6. The method of claim 1, wherein the storage medium is an optical disc.

* * * * *